(12) United States Patent
Whitehead (10) Patent No.: US 7,164,536 B2
(45) Date of Patent: Jan. 16, 2007

(54) OPTICALLY COUPLED TOROIDAL LENS:HEMI-BEAD BRIGHTNESS ENHANCER FOR TOTAL INTERNAL REFLECTION MODULATED IMAGE DISPLAYS

(75) Inventor: Lorne A. Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 142 days.

(21) Appl. No.: 11/080,634

(22) Filed: Mar. 16, 2005

(65) Prior Publication Data

US 2006/0209418 A1    Sep. 21, 2006

(51) Int. Cl.
G02B 27/10 (2006.01)
(52) U.S. Cl. .................. 359/618; 359/452; 359/454; 359/455; 359/459; 359/534; 359/536; 359/542; 359/833; 362/552; 362/560; 362/582; 362/333; 362/335; 362/339
(58) Field of Classification Search ................ 359/223, 359/452, 454, 455, 459, 534, 536, 537, 542, 359/618–619, 833; 362/552, 560, 582, 333, 362/335–337, 339
See application file for complete search history.

(56) References Cited

U.S. PATENT DOCUMENTS

| | | |
|---|---|---|
| 3,291,554 A | 12/1966 | Price |
| 3,556,638 A | 1/1971 | Banks et al. |
| 3,571,511 A | 3/1971 | Myer |
| 3,612,653 A | 10/1971 | Rajchman |
| 3,698,793 A | 10/1972 | Tellerman |
| 3,730,608 A | 5/1973 | Castegnier |
| 3,746,785 A | 7/1973 | Goodrich |
| 3,796,480 A | 3/1974 | Preston, Jr. et al. |
| 3,987,668 A | 10/1976 | Popenoe |
| 4,113,360 A | 9/1978 | Baur et al. |
| 4,135,960 A | 1/1979 | Shuppert et al. |
| 4,148,563 A | 4/1979 | Herbert |
| 4,156,745 A | 5/1979 | Hatzakis et al. |

(Continued)

FOREIGN PATENT DOCUMENTS

DE    3720861 A    3/1989

(Continued)

OTHER PUBLICATIONS

Dalisa, A., "Electrophoretic Display Technology," IEEE Transactions on Electron Devices, vol. 24, 827-834, 1977.

(Continued)

*Primary Examiner*—Evelyn A. Lester
(74) *Attorney, Agent, or Firm*—Oyen Wiggs Green & Mutala LLP (57) ABSTRACT

A brightness enhancing structure for a reflective display. A plurality of transparent hemi-beads form a film substantially covering and protruding inwardly from the structure's inward surface. A corresponding plurality of microstructured toroidal lenses are provided on the structure's outward side. Each lens is optically coupled to an adjacent one of the hemi-beads to redirect incident light rays toward the adjacent hemi-bead, such that the redirected light is totally internally reflected by the hemi-bead and reflected back in a direction approximately opposite that of the incident rays. This substantially reduces undesirable dark, non-reflective circular regions of each hemi-bead which would otherwise exist in the absence of this invention.

38 Claims, 12 Drawing Sheets

U.S. PATENT DOCUMENTS

| | | | |
|---|---|---|---|
| 4,165,155 A | 8/1979 | Gordon, II et al. |
| 4,218,302 A | 8/1980 | Dalisa et al. |
| 4,249,814 A | 2/1981 | Hull et al. |
| 4,324,456 A | 4/1982 | Dalisa |
| 4,391,490 A | 7/1983 | Hartke |
| 4,420,897 A | 12/1983 | Castleberry |
| 4,448,622 A | 5/1984 | Duchane et al. |
| 4,536,061 A | 8/1985 | Nishimura |
| 4,617,608 A | 10/1986 | Blonder et al. |
| 4,714,326 A | 12/1987 | Usui et al. |
| 4,723,834 A | 2/1988 | Van de Venne et al. |
| 4,867,515 A | 9/1989 | Normandin |
| 4,895,428 A | 1/1990 | Nelson et al. |
| 5,045,847 A | 9/1991 | Tarui et al. |
| 5,099,343 A | 3/1992 | Margerum et al. |
| 5,128,782 A | 7/1992 | Wood |
| 5,147,519 A | 9/1992 | Legge |
| 5,221,987 A | 6/1993 | Laughlin |
| 5,235,463 A | 8/1993 | Broussoux et al. |
| 5,283,148 A | 2/1994 | Rao |
| 5,301,009 A | 4/1994 | Shurtz, II |
| 5,317,667 A | 5/1994 | Weber et al. |
| 5,319,491 A | 6/1994 | Selbrede |
| 5,396,350 A | 3/1995 | Beeson et al. |
| 5,397,669 A | 3/1995 | Rao |
| 5,425,710 A | 6/1995 | Khair et al. |
| 5,455,709 A | 10/1995 | Dula, III et al. |
| 5,504,618 A | 4/1996 | Hirs et al. |
| 5,530,053 A | 6/1996 | Rao et al. |
| 5,530,067 A | 6/1996 | Rao et al. |
| 5,555,327 A | 9/1996 | Laughlin |
| 5,555,558 A | 9/1996 | Laughlin |
| 5,561,541 A | 10/1996 | Sharp et al. |
| 5,566,260 A | 10/1996 | Laughlin |
| 5,598,280 A | 1/1997 | Nishio et al. |
| 5,608,837 A | 3/1997 | Tai et al. |
| 5,731,900 A | 3/1998 | Milner |
| 5,745,632 A | 4/1998 | Dreyer |
| 5,841,916 A | 11/1998 | Laughlin |
| 5,880,886 A | 3/1999 | Milner |
| 5,959,777 A | 9/1999 | Whitehead |
| 5,999,307 A | 12/1999 | Whitehead |
| 6,064,784 A | 5/2000 | Whitehead et al. |
| 6,088,013 A | 7/2000 | Montour et al. |
| 6,215,920 B1 | 4/2001 | Whitehead et al. |
| 6,304,365 B1 | 10/2001 | Whitehead |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,562,889 B1 | 5/2003 | Rao |
| 6,819,471 B1 | 11/2004 | Amundson et al. |
| 2003/0165016 A1 | 9/2003 | Whitehead et al. |
| 2004/0174584 A1 | 9/2004 | Whitehead et al. |
| 2004/0190144 A1* | 9/2004 | Hannington ............... 359/452 |

FOREIGN PATENT DOCUMENTS

| | | |
|---|---|---|
| DE | 4343808 A1 | 6/1995 |
| EP | 0023741 A1 | 2/1981 |
| EP | 204427 A | 12/1986 |
| EP | 728799 A1 | 8/1996 |
| EP | 797127 A | 9/1997 |
| EP | 0807832 A2 | 11/1997 |
| GB | 2265024 A | 9/1993 |
| JP | 54057576 | 5/1979 |
| JP | 55-525 | 1/1980 |
| JP | 59078816 | 5/1984 |
| JP | 60038130 | 2/1985 |
| JP | 60-185918 | 9/1985 |
| JP | 2-254405 | 10/1990 |
| JP | 5-281481 | 10/1993 |
| WO | WO 95/31738 | 11/1995 |
| WO | WO 97/31276 | 8/1997 |
| WO | WO 99/12069 | 3/1999 |
| WO | WO 99/15595 | 4/1999 |
| WO | WO 99/28890 | 6/1999 |
| WO | WO 00/17477 | 3/2000 |
| WO | WO 01/37627 | 5/2001 |
| WO | WO 03/075085 | 9/2003 |

OTHER PUBLICATIONS

Mürau et al, "The understanding and elimination of some suspension instabilities in an electrophoretic display," J. Appl. Phys., vol. 49, No. 9, Sep. 1978, 4820-4829.

Harbour et al, "Subdivided Electrophoretic Display", Xerox Disclosure Journal, vol. 4, No. 6, Nov. 1979, p. 705.

L.A. Whitehead, "Simplified Ray Tracing in Cylindrical Systems", Applied Optics, vol. 21, No. 19, pp. 3536-3538, Oct. 1, 1982.

Carlson et al, "Surface Property Changes Induced In Poly(1-Hexene) Elastomer By High Energy Ion Irradition", Proc. 4th Intl. Conf. on Ion Bean Modification of Materials, Ithaca, NY, Jul. 16-20, 1984 pp. 507-512.

Remillard et al, "Evanescent-wave scattering by electrophoretic microparticles: a mechanism for optical switching", Applied Optics, vol. 34, No. 19, Jul. 1, 1995, pp. 3777-3785.

George Kotelly, "Patented fiber switch revs speed, cuts cost", in "Lightwave" Oct. 1995 web site publication of PennWell Publishing Co., Tulsa, OK.

M. Mohammadi, "Colloidal Refractometry: Meaning and Measurement of Refractive Index for Dispersions; The Science That Time Forgot", Advances in Colloid and Interface Science 62 (1995) 17-29.

Qin et al, "Elastomeric Light Valves", Advanced Materials 1997, 9 No. 5, pp. 407-410.

3M Fluorinert™ Electronic Liquid brochure, http://www.3m.com/fluids/florinrt.html, Sep. 1998.

Neufeldt, Victoria. Webster's New World Dictionary of American English, 3rd College Edition. Webster's New World, New York, New York, p. 857. Dec. 31, 1998.

Drzaic, P., et al, "A Printed and Rollable Bistable Electronic Display," Society for Information Display Symposium Proceedings, 1131-1134, 1998.

Nakamura, E. et al, "Development of Electrophoretic Display Using Microencapsulated Suspension," Society for Information Display Symposium Proceedings, 1014-1017, 1998.

Mossman, M.A. et al, "New Reflective Display Technique Based on Total Internal Reflection in Prismatic Microstructures," Society for Information Display International Research Display Conference Proceedings, 311-314, 2000.

"Krytox® 157 FS Fluorinated Oil," 2000 brochure of E.I. du Pont de Nemours and Company.

Kambe et al, in "Refractive Index Engineering of Nano-Polymer Composites," Materials Research Society Conference, San Francisco, Apr. 16-20, 2001.

Mossman, M.A. et al, "New Reflective Display Technique Based on Total Internal Reflection and Subtractive Colour Filtering," Society for Information Display Symposium Proceedings, 1054-1057, 2001.

Mossman, M.A. et al, "New Method for Obtaining Long-Term Image Quality in a TIR-Based Electrophoretic Display," Society for Information Display, International Research Display Conference Proceedings, 851-854, Oct. 1-4, 2002.

A High Reflectance, Wide Viewing Angle Reflective Display Using Total Internal Reflection in Micro-Hemispheres, Mossman et al, Society for Information Display, 23rd Intl. Display Research Conf., Sep. 15-18, 2003, Phoenix, AZ.

* cited by examiner

OPTICALLY COUPLED TOROIDAL LENS:HEMI-BEAD BRIGHTNESS ENHANCER FOR TOTAL INTERNAL REFLECTION MODULATED IMAGE DISPLAYS

TECHNICAL FIELD

This invention improves the brightness of reflective displays of the type described in international patent publication WO 03/075085 dated 12 Sep. 2003, which is incorporated herein by reference.

BACKGROUND

Figure 1A:
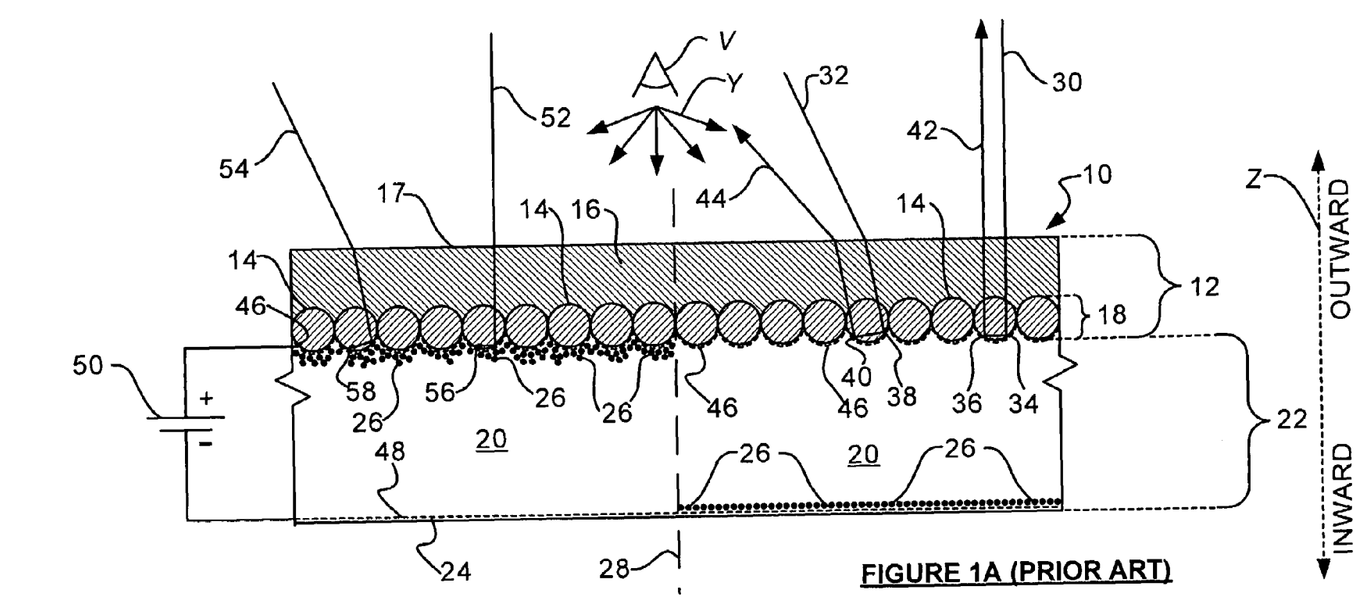
FIG. 1A is a fragmented cross-sectional view, on a greatly enlarged scale, of a portion of an electrophoretically frustrated prior art TIR display.

FIG. 1A depicts a portion of a prior art front-lit electrophoretically frustrated total internal reflection (TIR) modulated display 10 of the type described in international patent publication WO 03/075085. Display 10 includes a transparent outward sheet 12 formed by partially embedding a large plurality of high refractive index (e.g. $\eta_1 > \sim 1.90$) transparent spherical or approximately spherical beads 14 in the inward surface of a high refractive index (e.g. $\eta_2 > \sim 1.75$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. Minimal gaps (ideally, no gaps) remain between adjacent beads.

An electrophoresis medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_3 \sim 1.27$) available from 3M, St. Paul, Minn. is a suitable electrophoresis medium. A bead:liquid TIR interface is thus formed. Medium 20 contains a finely dispersed suspension of light scattering and/or absorptive particles 26 such as pigments, dyed or otherwise scattering/absorptive silica or latex particles, etc. Sheet 24's optical characteristics are relatively unimportant: sheet 24 need only form a reservoir for containment of electrophoresis medium 20 and particles 26, and serve as a support for electrode 48.

As is well known, the TIR interface between two media having different refractive indices is characterized by a critical angle $\theta_c$. Light rays incident upon the interface at angles less than $\theta_c$ are transmitted through the interface. Light rays incident upon the interface at angles greater than $\theta_c$ undergo TIR at the interface. A small critical angle is preferred at the TIR interface since this affords a large range of angles over which TIR may occur. In the FIG. 1A prior art display, a relatively large ratio of the index of refraction of beads 14 ($\eta_1$) and material 16 ($\eta_2$) to that of Fluorinert ($\eta_3$) is required to obtain a small critical angle (about 41.4°). This invention facilitates display brightness enhancement without resort to such high refractive index materials. High reflectance is achieved by the invention using standard materials (e.g. polycarbonate) having refractive indices of about 1.5 to 1.6.

In the absence of electrophoretic activity, as is illustrated to the right of dashed line 28 in FIG. 1A, a substantial fraction of the light rays passing through sheet 12 and beads 14 undergoes TIR at the inward side of beads 14. For example, incident light rays 30, 32 are refracted through material 16 and beads 14. The rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

A voltage can be applied across medium 20 via electrodes 46, 48, which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Electrode 48 need not be transparent. If electrophoresis medium 20 is activated by actuating voltage source 50 to apply a voltage between electrodes 46, 48 as illustrated to the left of dashed line 28, suspended particles 26 are electrophoretically moved into the region where the evanescent wave is relatively intense (i.e. within 0.25 micron of the inward surfaces of inwardly protruding beads 14, or closer). When electrophoretically moved as aforesaid, particles 26 scatter or absorb light, by modifying the imaginary and possibly the real component of the effective refractive index at the bead:liquid TIR interface. This is illustrated by light rays 52, 54 which are scattered and/or absorbed as they strike particles 26 inside the evanescent wave region at the bead:liquid TIR interface, as indicated at 56, 58 respectively, thus achieving a "dark" appearance in each non-reflective absorption region or pixel.

As described above, the net optical characteristics of outward sheet 12 can be controlled by controlling the voltage applied across medium 20 via electrodes 46, 48. The electrodes can be segmented to control the electrophoretic activation of medium 20 across separate regions or pixels of sheet 12, thus forming an image.

Figure 2:
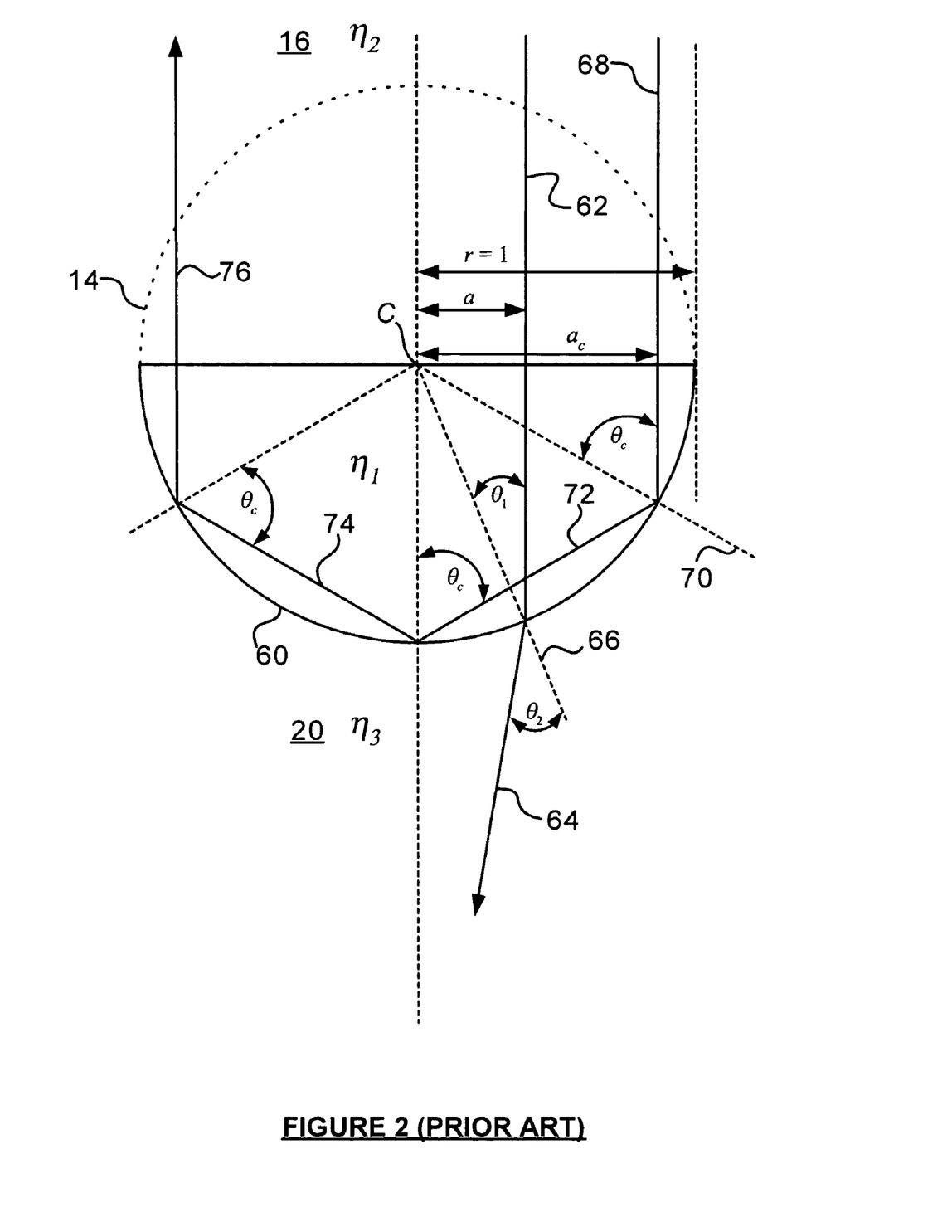
FIG. 2 is a cross-sectional view, on a greatly enlarged scale, of a hemispherical portion of one of the high refractive index spherical beads of the FIG. 1A apparatus.

FIG. 2 depicts, in enlarged cross-section, an inward hemispherical or "hemi-bead" portion 60 of one of spherical beads 14. Hemi-bead 60 has a normalized radius r=1 and a refractive index $\eta_1$. A light ray 62 perpendicularly incident (through material 16) on hemi-bead 60 at a radial distance a from hemi-bead 60's centre C encounters the inward surface of hemi-bead 60 at an angle $\theta_1$ relative to radial axis 66. For purposes of this theoretically ideal discussion, it is assumed that material 16 has the same refractive index as hemi-bead 60 (i.e. $\eta_1 = \eta_2$), so ray 62 passes from material 16 into hemi-bead 60 without refraction. Ray 62 is refracted at the inward surface of hemi-bead 60 and passes into electrophoretic medium 20 as ray 64 at an angle $\theta_2$ relative to radial axis 66.

Now consider incident light ray 68 which is perpendicularly incident (through material 16) on hemi-bead 60 at a distance $$a_c = \frac{\eta_3}{\eta_1}$$

from hemi-bead 60's centre C. Ray 68 encounters the inward surface of hemi-bead 60 at the critical angle $\theta_c$ (relative to radial axis 70), the minimum required angle for TIR to occur. Ray 68 is accordingly totally internally reflected, as ray 72, which again encounters the inward surface of hemi-bead 60 at the critical angle $\theta_c$. Ray 72 is accordingly totally internally reflected, as ray 74, which also encounters the inward surface of hemi-bead 60 at the critical angle $\theta_c$. Ray 74 is accordingly totally internally reflected, as ray 76, which passes perpendicularly through hemi-bead 60 into the embedded portion of bead 14 and into material 16. Ray 68 is thus reflected back as ray 76 in a direction approximately opposite that of incident ray 68.

Figure 3A:
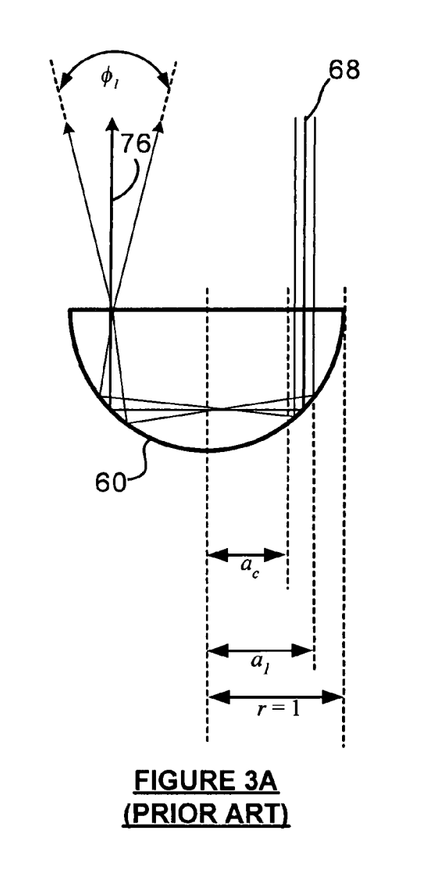
FIGS. 3A, 3B and 3C depict semi-retro-reflection of light rays perpendicularly incident on the FIG. 2 hemispherical structure at increasing off-axis distances at which the incident rays undergo TIR two, three and four times respectively.
Figure 3B:
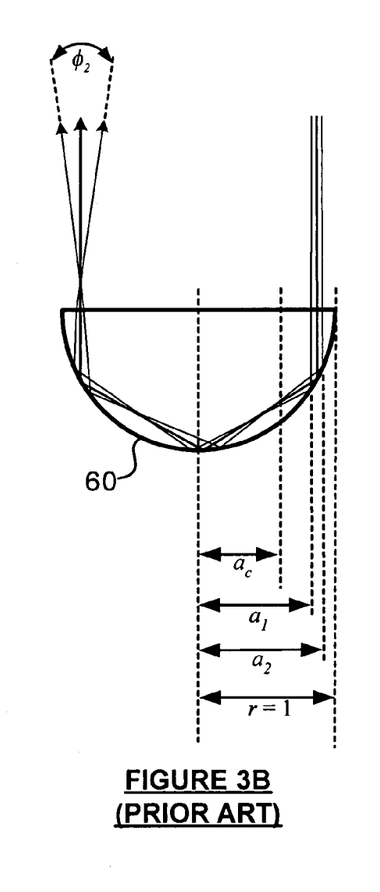
Figure 3C:
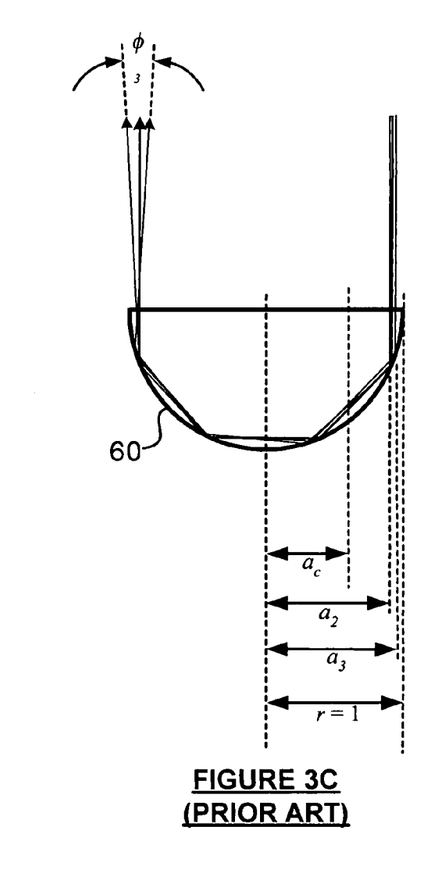

All light rays which are incident on hemi-bead 60 at distances $a \geq a_c$ from hemi-bead 60's centre C are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications. FIGS. 3A, 3B and 3C depict three of hemi-bead 60's reflection modes. These and other modes coexist, but it is useful to discuss each mode separately.

In FIG. 3A, light rays incident within a range of distances $a_c < a \leq a_1$ undergo TIR twice (the 2-TIR mode) and the reflected rays diverge within a comparatively wide arc $\phi_1$ centred on a direction opposite to the direction of the incident light rays. In FIG. 3B, light rays incident within a range of distances $a_1 < a \leq a_2$ undergo TIR three times (the 3-TIR mode) and the reflected rays diverge within a narrower arc $\phi_2 < \phi_1$ which is again centred on a direction opposite to the direction of the incident light rays. In FIG. 3C, light rays incident within a range of distances $a_2 < a \leq a_3$ undergo TIR four times (the 4-TIR mode) and the reflected rays diverge within a still narrower arc $\phi_3 < \phi_2$ also centred on a direction opposite to the direction of the incident light rays. Hemi-bead 60 thus has a "semi-retro-reflective," partially diffuse reflection characteristic, causing display 10 to have a diffuse appearance akin to that of paper.

Figure 1B:
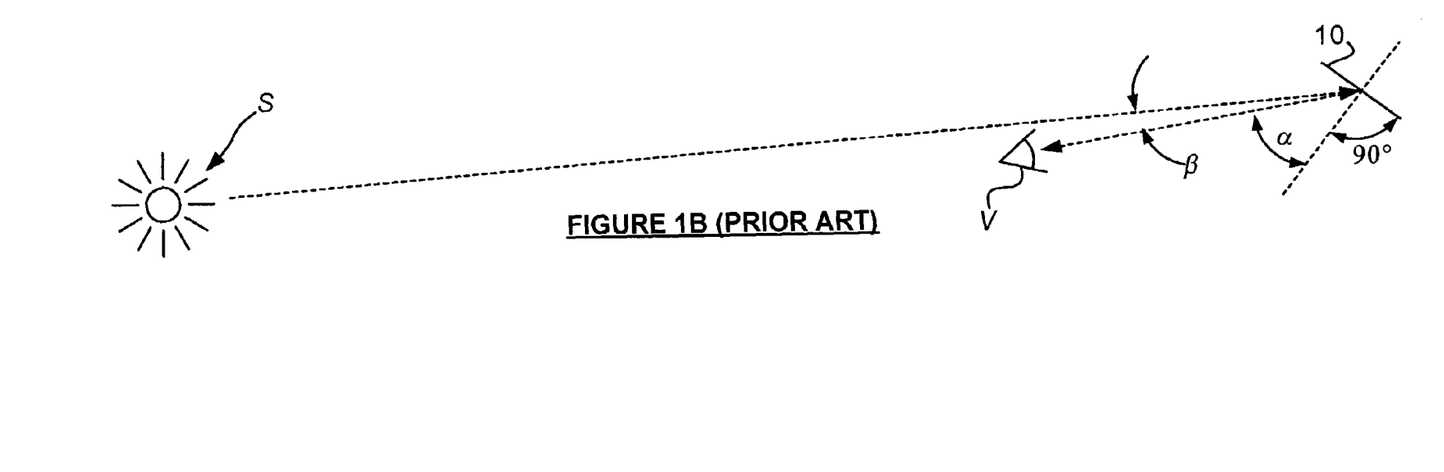
FIG. 1B schematically illustrates the wide angle viewing range α of the FIG. 1A apparatus, and the angular range β of the illumination source.

Display 10 has relatively high apparent brightness, comparable to that of paper, when the dominant source of illumination is behind the viewer, within a small angular range. This is illustrated in FIG. 1B which depicts the wide angular range α over which viewer V is able to view display 10, and the angle β which is the angular deviation of illumination source S relative to the location of viewer V. Display's 10's high apparent brightness is maintained as long as β is not too large. At normal incidence, the reflectance R of hemi-bead 60 (i.e. the fraction of light rays incident on hemi-bead 60 that reflect by TIR) is given by $$R = 1 - \left(\frac{\eta_3}{\eta_1}\right)^2$$

where $\eta_1$ is the refractive index of hemi-bead 60 and $\eta_3$ is the refractive index of the medium adjacent the surface of hemi-bead 60 at which TIR occurs. Thus, if hemi-bead 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemi-bead 60 is formed of a high refractive index nano-composite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic.

Figure 4A:
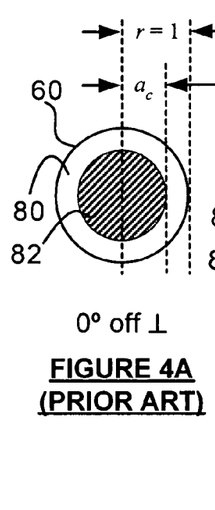
FIGS. 4A, 4B, 4C, 4D, 4E, 4F and 4G depict the FIG. 2 hemispherical structure, as seen from viewing angles which are offset 0°, 15°, 30°, 45°, 60°, 75° and 90° respectively from the perpendicular.
Figure 4B:
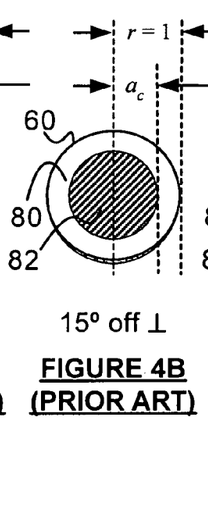
Figure 4C:
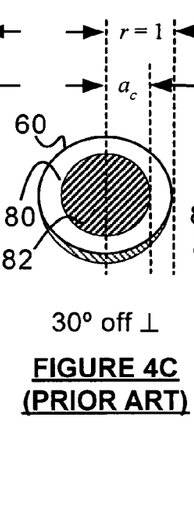
Figure 4D:
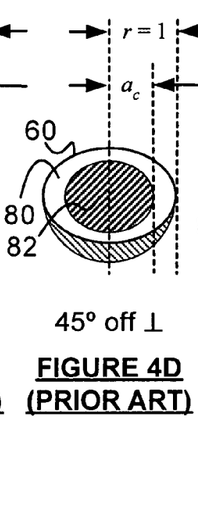
Figure 4E:
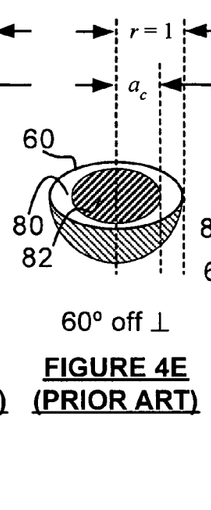
Figure 4F:
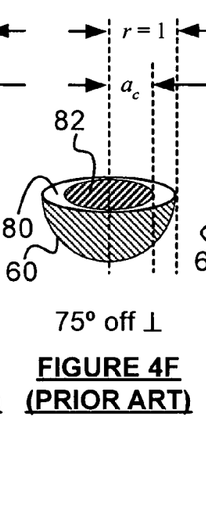
Figure 4G:
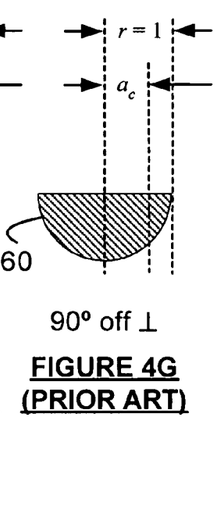

As shown in FIGS. 4A–4G, hemi-bead 60's reflectance is maintained over a broad range of incidence angles, thus enhancing display 10's wide angular viewing characteristic and its apparent brightness. For example, FIG. 4A shows hemi-bead 60 as seen from perpendicular incidence—that is, from an incidence angle offset 0° from the perpendicular. In this case, the portion 80 of hemi-bead 60 for which $a \geq a_c$ appears as an annulus. The annulus is depicted as white, corresponding to the fact that this is the region of hemi-bead 60 which reflects incident light rays by TIR, as aforesaid. The annulus surrounds a circular region 82 which is depicted as dark, corresponding to the fact that this is the non-reflective region of hemi-bead 60 within which incident rays are absorbed and do not undergo TIR. FIGS. 4B–4G show hemi-bead 60 as seen from incident angles which are respectively offset 15°, 30°, 45°, 60°, 75° and 90° from the perpendicular. Comparison of FIGS. 4B–4G with FIG. 4A reveals that the observed area of reflective portion 80 of hemi-bead 60 for which $a \geq a_c$ decreases only gradually as the incidence angle increases. Even at near glancing incidence angles (FIG. 4F) an observer will still see a substantial part of reflective portion 80, thus giving display 10 a wide angular viewing range over which high apparent brightness is maintained.

This invention further increases the reflectance of display 10 over the preferred 0° to 40° angular viewing range, thereby improving the display's appearance. Although each one of beads 14 is preferably invisibly small, (i.e. about 2–50 microns in diameter), and although beads 14 can be packed closely together to provide a surface with high apparent reflectivity due to the presence of many tiny closely packed reflective annular portions 80, each portion 80 surrounds a dark circular region 82 as aforesaid. The cumulative dark area represented by all of dark circular regions 82 diminishes the overall surface reflectance of display 10. It is desirable to reduce this dark area as much as possible. This invention provides a novel method for accomplishing this and thereby increasing the reflectance of display 10.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

As previously explained, the reflectance R of a hemisphere (i.e. the fraction of light rays incident on the hemisphere that reflect by TIR) is given by $$R = 1 - \left(\frac{\eta_3}{\eta_1}\right)^2$$

where $\eta_1$ is the refractive index of the hemisphere and $\eta_3$ is the refractive index of the medium adjacent the hemisphere surface at which TIR occurs.

An estimate of the reflectance of an array of hemispheres corresponding to the inward "hemi-bead" portions of each one of spherical beads 14 depicted in FIG. 1A can be obtained by multiplying the reflectance of an individual hemisphere by the hemispheres' packing efficiency coefficients f. Calculation of the packing efficiency coefficient f of a closely packed structure involves application of straightforward geometry techniques which are well known to persons skilled in the art. For this invention, the ideal packing structure is the cubic closest packed (CCP) structure, which has a packing efficiency f∝π/4~78.54%. The hexagonal closest packed (HCP) structure yields a higher packing efficiency f∝π/(6·tan 30°)~90.7%, but it is more difficult to design a structure for enhancing the reflectance of an HCP array of hemispheres.

Figure 5:
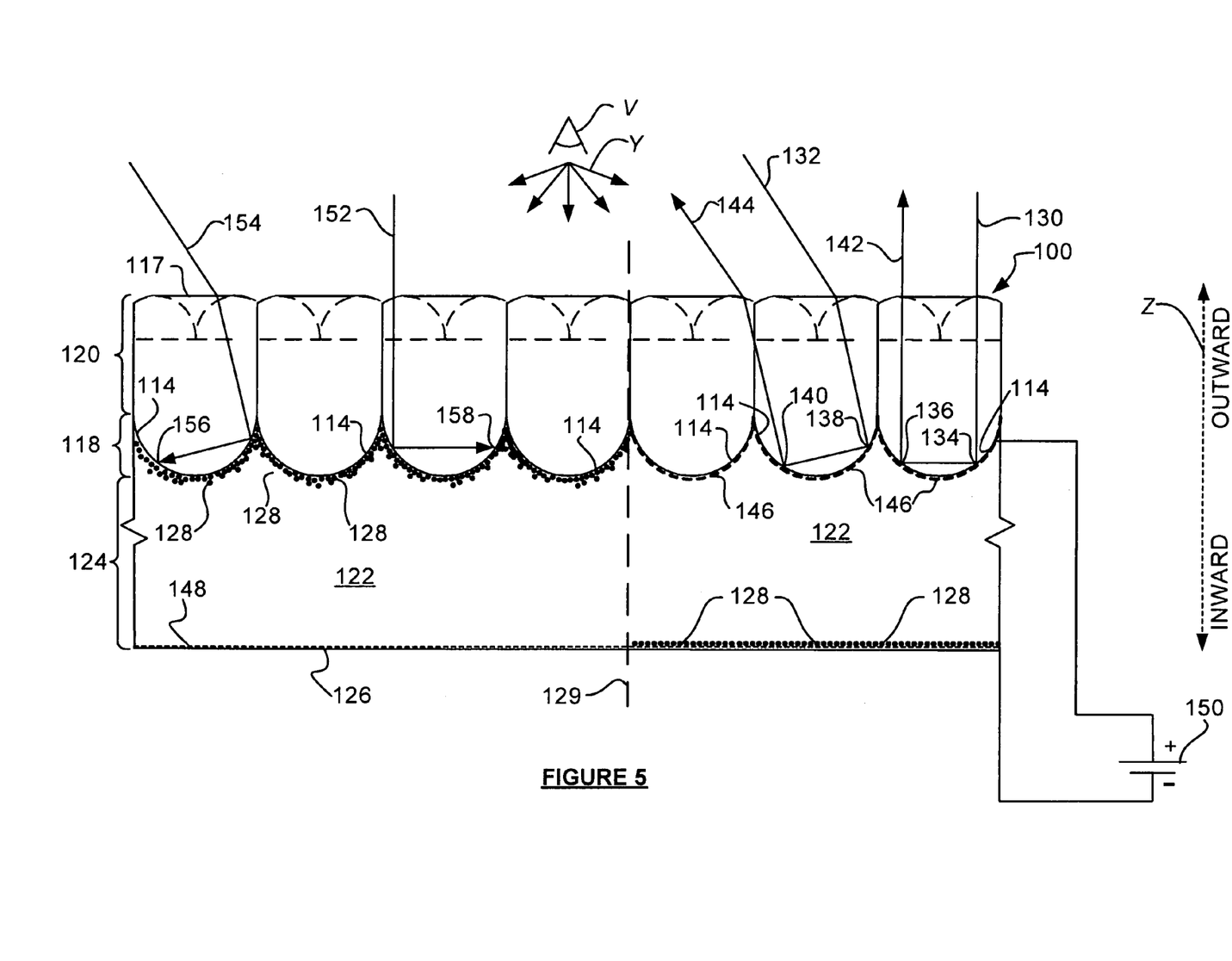
FIG. 5 is a fragmented cross-sectional view, on a greatly enlarged scale, of a portion of an electrophoretically frustrated TIR display in accordance with the invention.

As previously explained, a substantial portion of light rays which are perpendicularly incident on the flat outward face of hemi-bead 60 at distances a<$a_c$ from hemi-bead 60's centre C do not undergo TIR and are therefore not reflected by hemi-bead 60. Instead, a substantial portion of such light rays are scattered and/or absorbed by prior art display 10, yielding a dark non-reflective circular region 82 on hemi-bead 60. As shown in FIG. 5, this invention superimposes, on the outward side of display 100's transparent hemi-bead monolayer array 118, a transparent microstructured surface 120 which redirects incident light so that light rays passing through surface 120 undergo TIR at and are accordingly reflected by one of hemi-beads 114, rather than being transmitted through the hemi-bead and absorbed.

More particularly, FIG. 5 depicts a portion of a front-lit electrophoretically frustrated TIR modulated display 100. Hemi-bead monolayer array 118 and microstructured surface 120 are formed of a transparent polymeric material having a refractive index $\eta_1$. Viewer V observes display 100's outward viewing surface 117 through an angular range of viewing directions Y. The "inward" and "outward" directions are indicated in FIG. 5 by double-headed arrow Z. Hemi-beads 114 are formed closely together to provide an inwardly projecting monolayer 118 having a thickness approximately equal to the radius of one of hemi-beads 114. Hemi-beads 114 may for example be 40–100 micron diameter glass beads embedded in the polymeric material.

An electrophoresis medium 122 is maintained adjacent the portions of hemi-beads 114 which protrude inwardly from monolayer 118 by containment of medium 122 within a reservoir 124 defined by lower sheet 126. An inert, low refractive index (i.e. less than about 1.35), low viscosity, electrically insulating liquid such as Fluorinert™ perfluorinated hydrocarbon liquid ($\eta_3$~1.27) available from 3M, St. Paul, Minn. is a suitable electrophoresis medium. A hemi-bead:liquid TIR interface is thus formed. Medium 122 contains a finely dispersed suspension of light scattering and/or absorptive particles 128 such as pigments, dyed or otherwise scattering/absorptive silica or latex particles, etc. Sheet 126's optical characteristics are relatively unimportant: sheet 126 need only form a reservoir for containment of electrophoresis medium 122 and particles 128, and serve as a support for electrode 148.

In the absence of electrophoretic activity, as is illustrated to the right of dashed line 129 in FIG. 5, a substantial fraction of the light rays passing through microstructured surface 120 and hemi-bead mono-layer array 118 undergoes TIR at the inward side of hemi-beads 114. For example, incident light rays 130, 132 are refracted through microstructured surface 120 and hemi-bead monolayer array 118. The rays undergo TIR two or more times at the bead:liquid TIR interface, as indicated at points 134, 136 in the case of ray 130; and indicated at points 138, 140 in the case of ray 132. The totally internally reflected rays are then refracted back through hemi-bead monolayer array 118 and microstructured surface 120 and emerge as rays 142, 144 respectively, achieving a "white" appearance in each reflection region or pixel.

A voltage can be applied across electrophoresis medium 122 via electrodes 146, 148. Electrode 146 is transparent and substantially thin to minimize its interference with light rays at the hemi-bead:liquid TIR interface. Electrode 148 need not be transparent. If electrophoresis medium 122 is activated by actuating voltage source 150 to apply a voltage between electrodes 146, 148 as illustrated to the left of dashed line 129, suspended particles 128 are electrophoretically moved into the region where the evanescent wave is relatively intense (i.e. within 0.25 micron of the inward surfaces of inwardly protruding hemi-beads 114, or closer). When electrophoretically moved as aforesaid, particles 128 scatter or absorb light, by modifying the imaginary and possibly the real component of the effective refractive index at the bead:liquid TIR interface. This is illustrated by light rays 152, 154 which are scattered and/or absorbed as they strike particles 128 inside the evanescent wave region at the bead:liquid TIR interface, as indicated at 156, 158 respectively, thus achieving a "dark" appearance in each non-reflective absorption region or pixel. The net optical characteristics of display 100 can be controlled by controlling the voltage applied across medium 122 via electrodes 146, 148. The electrodes can be segmented to control the electrophoretic activation of medium 122 across separate regions or pixels of hemi-bead monolayer array 118 and microstructured surface 120, thus forming an image.

Figure 6:
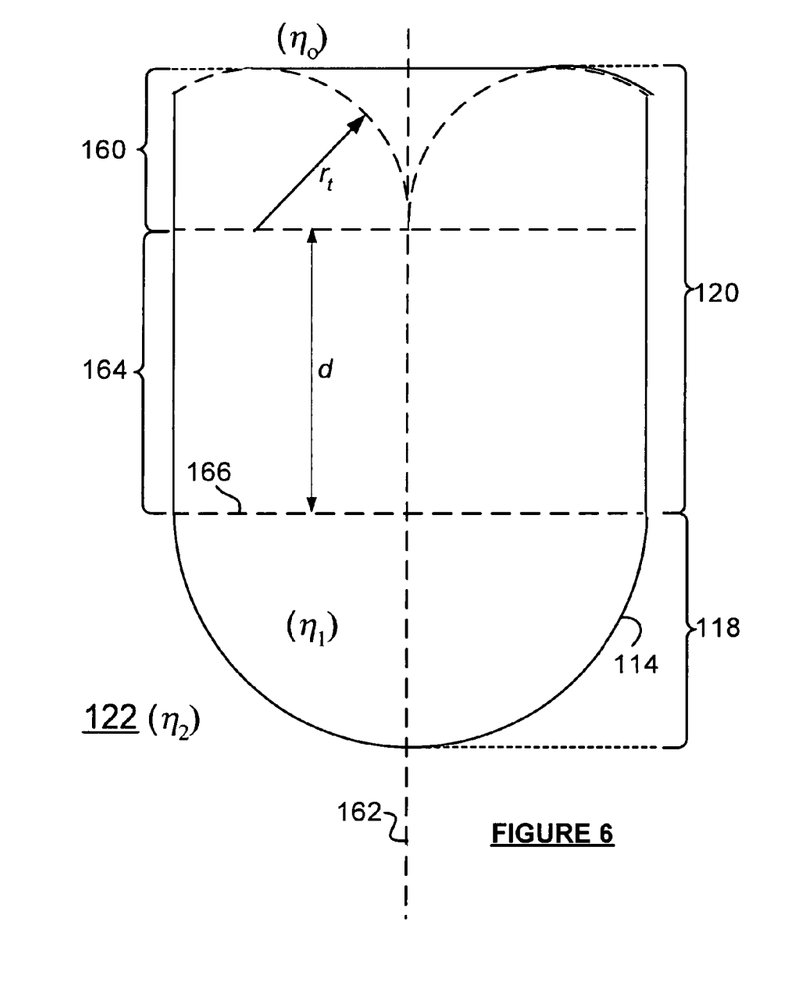
FIG. 6 is a cross-sectional view, on a greatly enlarged scale, of a single hemi-bead and associated toroidal lens structure of the FIG. 5 display.

FIG. 6 schematically depicts a portion of a suitable microstructured surface 120 consisting of a single hemi-bead 114 optically coupled to an adjacent substantially toroidal lens structure 160. Toroidal lens structure 160 is circumferentially truncated to match the diameter of hemi-bead 114, to facilitate CCP packing of adjacent hemi-beads-which would otherwise be prevented by the circumferentially extending portion of toroidal lens structure 160. As is well known, a toroid is a ringshaped surface generated by rotating a circle of radius $r_t$ (the so-called minor radius) around an axis that does not intersect the circle. Toroidal lens 160 is aligned relative to the flat, outward side of the adjacent hemi-bead 114, such that the perpendicular axis of symmetry of toroidal lens 160 is coincident with the perpendicular axis of symmetry of the adjacent hemi-bead 114, as indicated at 162. Central portion 164 of microstructured surface 120 is optically coupled between toroidal lens 160 and hemi-bead 114. This can be achieved by making hemi-bead 114, toroidal lens 160 and central portion 164 as a unitary object such as a thin film formed of a transparent sheet material such as polycarbonate.

Figure 7:
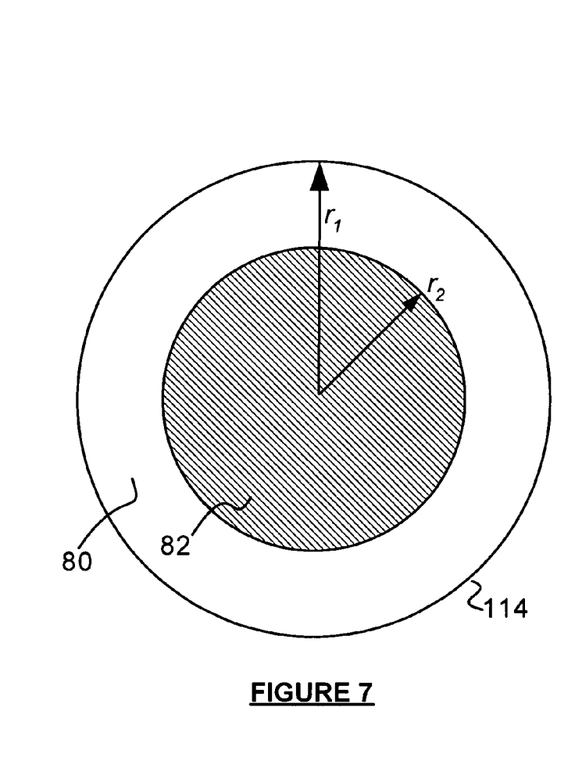
FIG. 7 is a top plan view of the hemi-bead portion of the FIG. 6 structure, as seen from a viewing angle offset 0° from the perpendicular.

FIG. 7 depicts hemi-bead 114, as seen from a viewing angle offset 0° from the perpendicular, and shows the aforementioned reflective annular portion 80 surrounding dark circular region 82 which would appear as aforesaid in the absence of this invention. Reflective annular portion 80 has a radius $r_1$. Dark circular region 82 has a radius $r_2$. The minor radius $r_t$ of toroidal portion 160 is selected to be:

$$r_t = r_o = \frac{r_1 + r_2}{2}$$

Central portion 164 has a selected thickness d as indicted in FIG. 6. As explained below, the value of d can be varied to selectably position the focal plane of toroidal lens 160, thereby changing the fraction of the incident light rays which will undergo TIR within hemi-bead 114. More particularly, toroidal lens 160 is sized and positioned, relative to the adjacent hemi-bead 114, so that the focal plane of toroidal lens 160, or more specifically the focal ring (i.e. annular light focusing zone) of toroidal lens 160, is substantially coplanar with the flat outward surface 166 of the adjacent hemi-bead 114 and is substantially centrally aligned inside the hemi-bead's reflective annular portion 80, substantially coextensive with the area where the hemi-bead's dark non-reflective circular region 82 would otherwise appear in the absence of this invention.

The optical performance of toroidal lens 160, hemi-bead 114 and central portion 164 can been modeled using Monte Carlo ray tracing software, such as the TracePro™ software available from Lambda Research Corporation, Littleton, Mass. d is initially selected to have a value $d_0$:

$$d_o = \left(\frac{\eta_o}{\eta_1 - \eta_o}\right) r_0$$

where $\eta_0$ is the refractive index of the medium (e.g. air) on the outward side of display 100's outward viewing surface 117 and $\eta_1$ is the refractive index of the material (e.g. glass or polymer, $\eta_1$ in the range of about 1.5 to 1.6) used to form hemi-bead 114. Such modeling reveals that the maximum reflectance exhibited by the FIG. 6 structure, at normal incidence, is about 70%, compared to the 43% maximum reflectance exhibited by an array of hemi-beads lacking adjacent toroidal lenses as described above. It is important to note that improved reflectance at normal incidence decreases the FIG. 6 structure's reflectance at wider viewing angles, because the structure reflects proportionately more light rays at normal or near-normal viewing angles, leaving proportionately fewer light rays to be reflected at wider viewing angles. It is generally desirable to optimize the improved reflectance of a reflective display over a wide range of viewing angles, since it is desirable for the displayed image to be viewable over a range of viewing angles. For this reason, it is advantageous to optimize the reflectance of the FIG. 6 structure for viewing angles ranging from 0° (normal incidence) to 40°. Monte Carlo ray trace modeling of the FIG. 6 structure reveals that the average reflectance exhibited by the structure over this angular range is about 43%.

Figure 8:
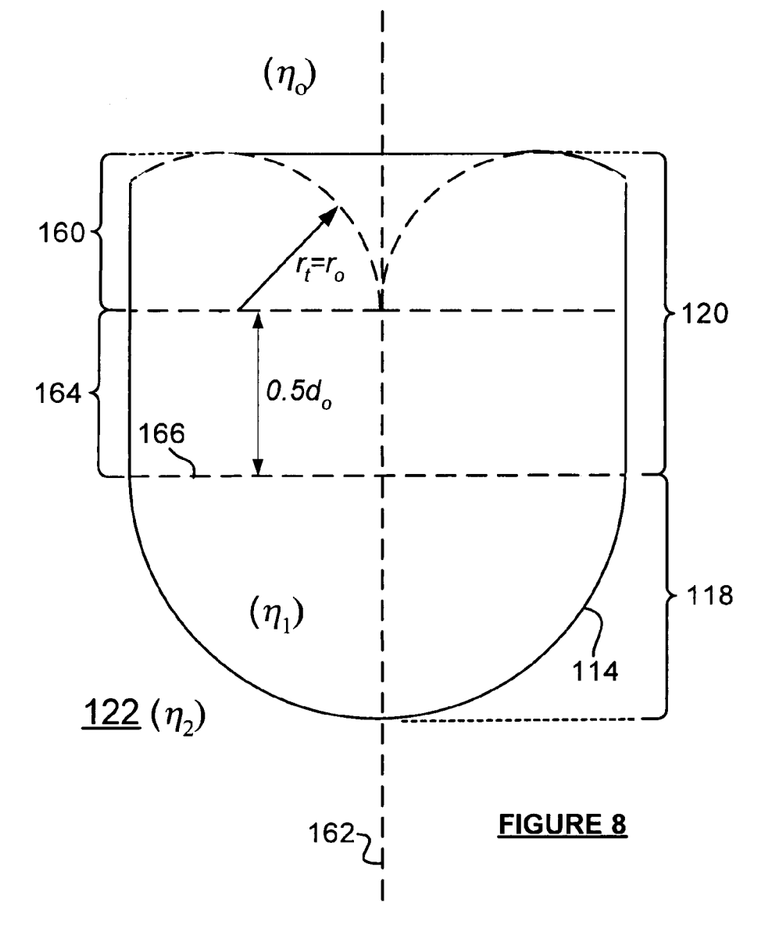
FIG. 8 is a cross-sectional view, on a greatly enlarged scale, of a first variant of the FIG. 6 structure.
Figure 9:
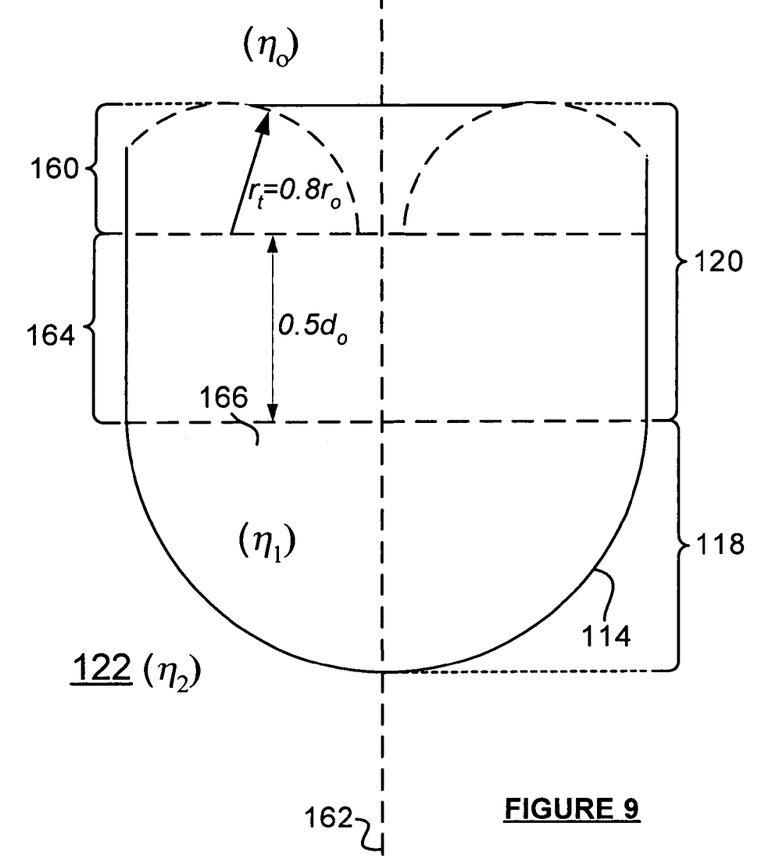
FIG. 9 is a cross-sectional view, on a greatly enlarged scale, of a second variant of the FIG. 6 structure.

The geometric parameters of the FIG. 6 structure, in particular the thickness d of central portion 164 and the minor radius $r_t$ of toroidal lens 160, can be experimentally varied to optimize the FIG. 6 structure's reflectance at normal incidence and its average reflectance over the preferred 0° to 40° angular viewing range. Monte Carlo ray trace modeling of such adjusted structures reveals useful variants of the FIG. 6 structure, as shown in FIGS. 8 and 9. It will be understood that the invention is not restricted to these variants, but applies generally to any microstructured surface having the desired light reflecting capability.

In the first variant structure shown in FIG. 8, toroidal lens 160 is positioned closer to the adjacent hemi-bead portion 114, so that the thickness d of central portion 164 is $d=0.5d_0$. Monte Carlo ray trace modeling of the first variant structure reveals that the first variant structure's maximum reflectance at normal incidence is about 82%, and that the first variant structure's average reflectance over the preferred 0° to 40° angular viewing range is about 51%.

In the second variant structure shown in FIG. 9, the minor radius $r_t$ of toroidal lens 160 is reduced to $r_t=0.8r_0$ and the second variant structure is again positioned closer to the adjacent hemi-bead portion 114, so that the thickness d of central portion 164 is $d=0.5d_0$. Monte Carlo ray trace modeling of the second variant structure reveals that the second variant structure's maximum reflectance at normal incidence is about 80% and that the second variant structure's average reflectance over the preferred 0° to 40° angular viewing range is about 52%.

Figure 10:
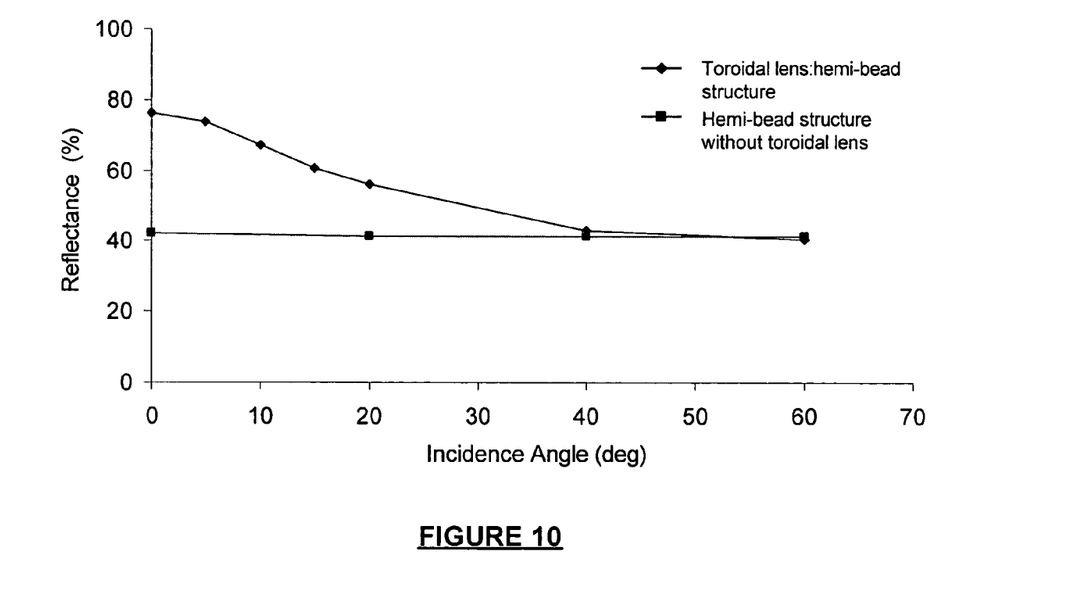
FIG. 10 graphically depicts percentage reflectance as a function of incidence angle for the FIG. 8 first variant apparatus.
Figure 11:
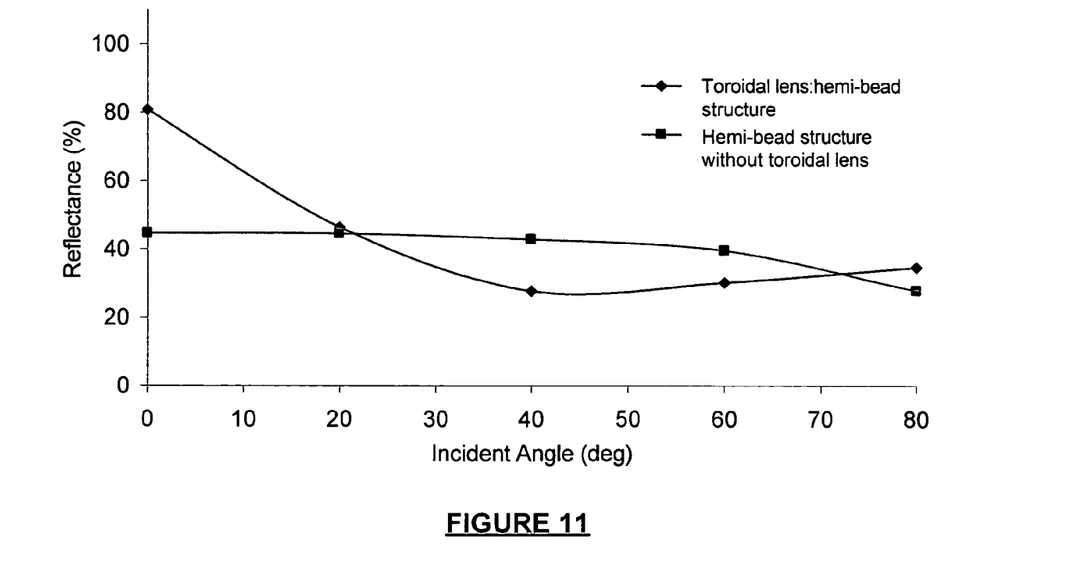
FIG. 11 graphically depicts percentage reflectance as a function of incidence angle for the FIG. 9 second variant apparatus.

The reflectance characteristics of the first and second variant structures (obtained by Monte Carlo ray trace modeling as aforesaid) are depicted in FIGS. 10 and 11 respectively, with the ratio of reflected light to incident light (i.e. percentage reflectance) being plotted as a function of incidence angle. The reflectance characteristic of a CCP array of hemi-beads lacking a light redirecting structure in accordance with this invention is also plotted in each of FIGS. 10 and 11. The first and second variant structures were modeled assuming that the structures were formed of a material having a refractive index $\eta_1=1.5$, that the medium on the outward side of the structure (e.g. air) has a refractive index $\eta_0=1$ and that the electrophoresis medium on the inward side of the structure has a refractive index $\eta_2=1$. Comparison of the FIG. 10 and 11 reflectance characteristics of the first and second variant structures, with the depicted reflectance characteristics of a CCP array of hemi-beads lacking a light reflecting structure in accordance with this invention, reveals that the increased reflectance attained at higher angles of incidence is due to reflection by the outward facing toroidal lens 160 of the first and second variant structures respectively, and is not due to TIR by the structures' inward hemi-bead portion 114.

The similar reflectance values exhibited by the first and second variant structures demonstrates that many possible variants of the FIG. 6 structure will have the light redirecting capability to improve the reflectance of a TIR-modulated display by significantly reducing the total dark area that would otherwise be caused by the dark circular regions 82 of each one of a plurality of hemi-beads 114 lacking a light redirecting structure in accordance with this invention.

Figure 12:
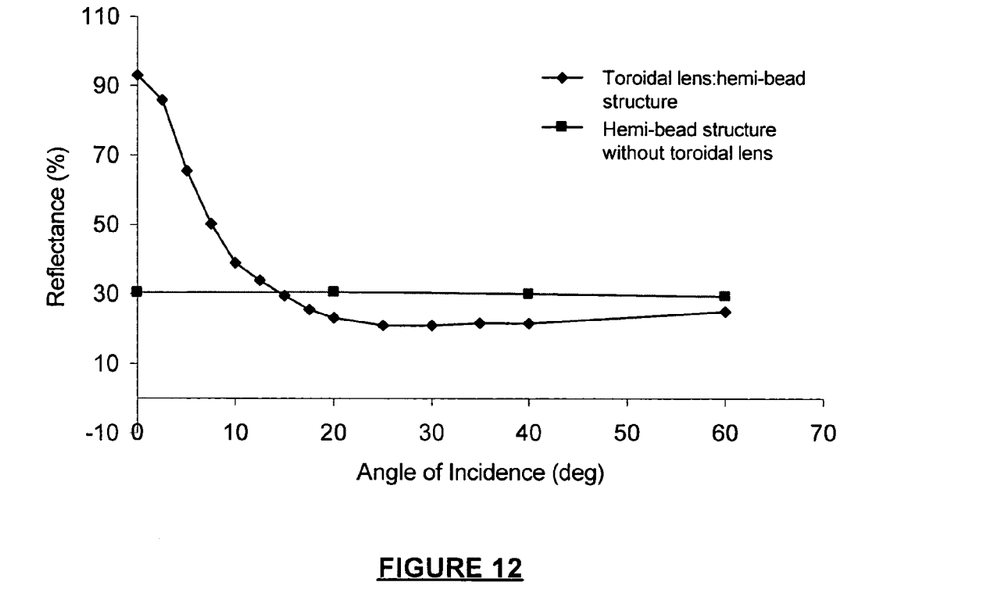
FIG. 12 graphically depicts percentage reflectance as a function of incidence angle for the FIG. 9 second variant apparatus having a polycarbonate:fluorinated hydrocarbon liquid TIR interface.
Figure 13:
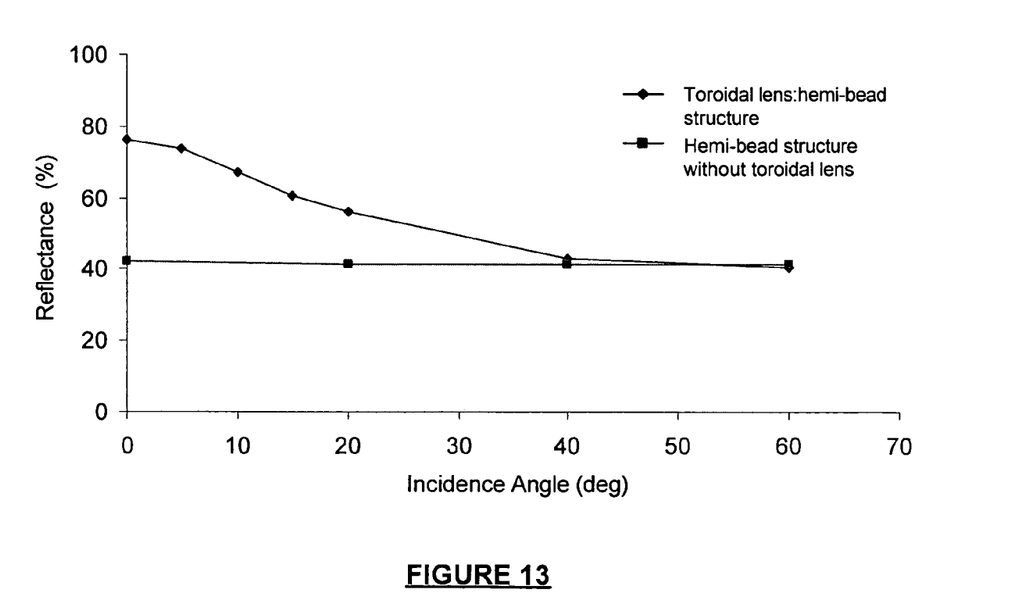
FIG. 13 graphically depicts percentage reflectance as a function of incidence angle for the FIG. 9 second variant apparatus having a doped polycarbonate:fluorinated hydrocarbon liquid structure.

FIGS. 12 and 13 graphically depict the reflectance characteristics (obtained by Monte Carlo ray trace modeling as aforesaid) when the first and second variant structures are formed of materials having different refractive indices. Specifically, FIG. 12 depicts the reflectance characteristic obtained when the second variant structure is formed of polycarbonate material having a refractive index $\eta_1=1.59$, where the medium on the outward side of the structure (e.g. air) has a refractive index $\eta_0=1$ and where the electrophoresis medium on the inward side of the structure is a fluorinated hydrocarbon liquid having a refractive index $\eta_2=1.276$. FIG. 12 reveals that the depicted structure's reflectance at normal incidence angle (i.e. as seen from a viewing angle offset 0° from the perpendicular) is higher primarily due to the increased value of the refractive index $\eta_1$ of the polycarbonate material used to form hemi-bead 114 and toroidal lens 160. However, the depicted structure's reflectance decreases more quickly as a function of viewing angle than either of the first or second variant structures primarily due to the increased value of the refractive index $\eta_2$ of the electrophoresis medium.

Although the invention facilitates display brightness enhancement without resort to high refractive index materials, such materials can be employed to further improve display reflectance. For example, FIG. 13 depicts the reflectance characteristic obtained when the second variant structure is formed of doped polycarbonate material having a relatively high refractive index $\eta_1=1.83$, where the medium on the outward side of the structure (e.g. air) has a refractive index $\eta_0=1$ and where the electrophoresis medium on the inward side of the structure is a fluorinated hydrocarbon liquid having a refractive index $\eta_2=1.276$. The reflectance characteristic of a CCP array of hemi-beads formed of the same material, but lacking a light reflecting structure in accordance with this invention, is also plotted in each of FIGS. 12 and 13. FIG. 13 reveals that the depicted structure's reflectance at normal incidence angle (i.e. as seen from a viewing angle offset 0° from the perpendicular) is higher primarily due to the increased value of the refractive index $\eta_1$ of the doped polycarbonate material used to form hemi-bead 114 and toroidal lens 160. The depicted structure's reflectance decreases less quickly as a function of viewing angle than that of the structure having the reflectance characteristic depicted in FIG. 12.

Figure 14A:
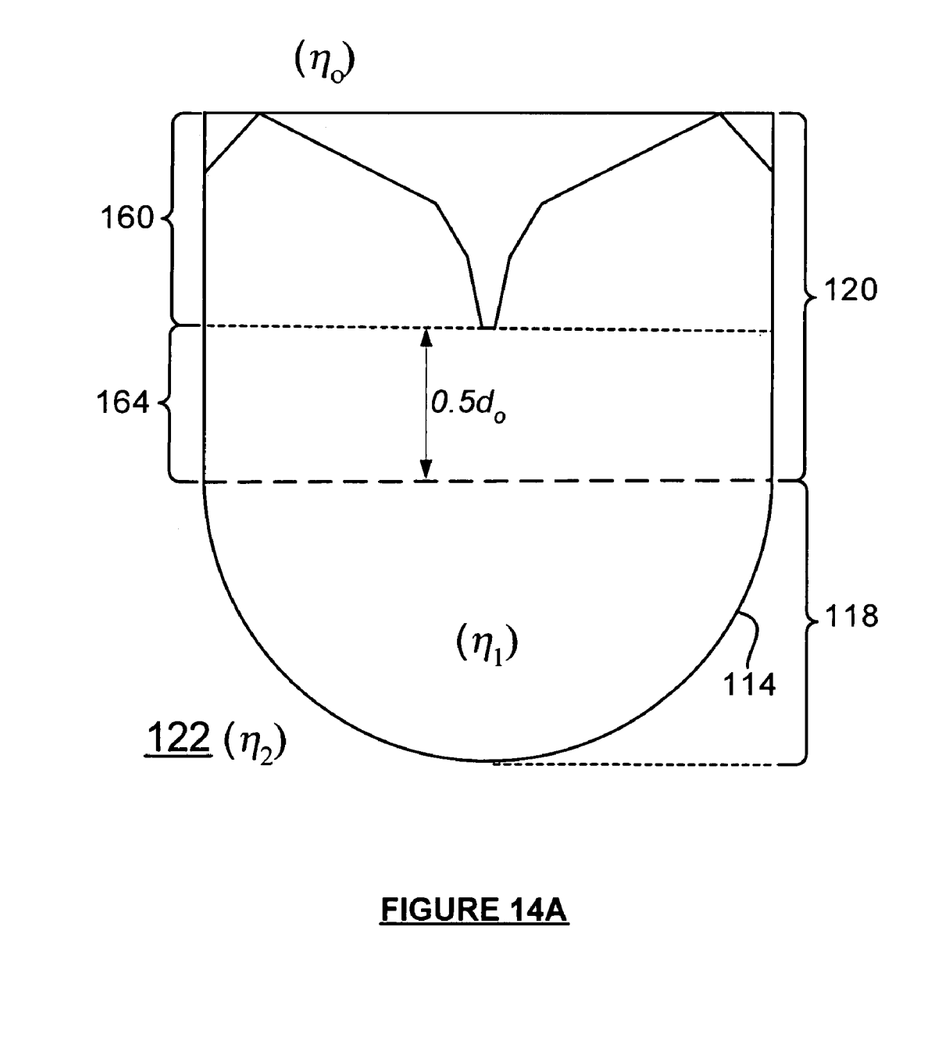
FIGS. 14A and 14B are respectively cross-sectional side elevation and top plan views of a conical approximation of the FIG. 6 structure.
Figure 14B:
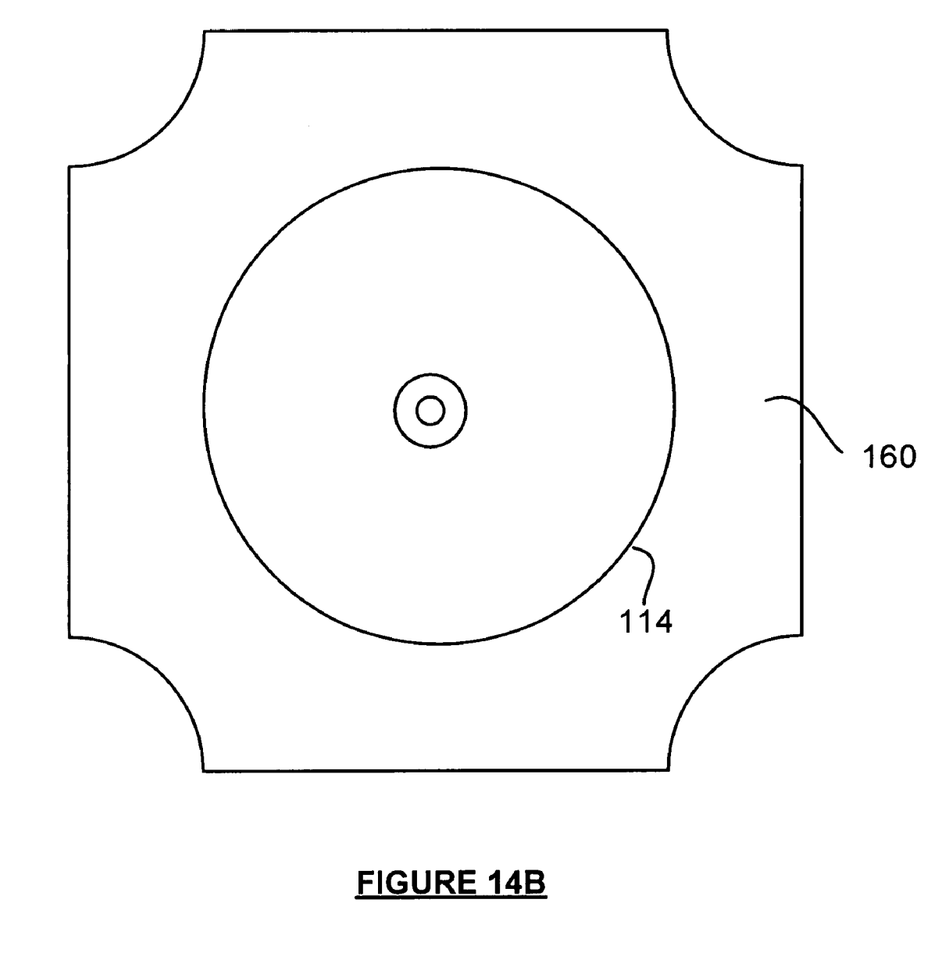

It may in some cases be easier to fabricate a conical approximation of the FIG. 6 structure or the first or second variant structures, as shown in FIGS. 14A and 14B. To facilitate this, the parameters $r_t$ and $d_0$ can be adjusted to compensate for the refractive index of the material used to fabricate a conical approximation (e.g. acrylic, $\eta\sim1.55$) and to reduce the difficulty of accurately machining a "perfect" toroidal shape as described and illustrated above. For example, a suitable conical approximation structure can be formed of truncated cones.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A brightness enhancing structure for a reflective display, the structure comprising a transparent sheet having a transparent hemi-bead monolayer array on an inward side of the sheet and a transparent microstructured surface on an outward side of the sheet, the hemi-bead monolayer array further comprising a plurality of approximately hemispherical transparent hemi-beads substantially covering and protruding inwardly from the inward surface of the sheet, the microstructured surface further comprising, for substantially each one of the hemi-beads, an adjacent structure for redirecting incident light toward the one of the hemi-beads such that the redirected light is totally internally reflected by the one of the hemi-beads.

2. A brightness enhancing structure as defined in claim 1, each one of the adjacent structures further comprising a lens structure having:
   an annular light focusing zone substantially coincident with an annular light reflecting region of the one of the hemi-beads, and
   a perpendicular axis of symmetry substantially coincident with a perpendicular axis of symmetry of the one of the hemi-beads.

3. A brightness enhancing structure as defined in claim 2, the lens structure further comprising a substantially toroidal lens having a minor radius $r_t$.

4. A brightness enhancing structure as defined in claim 2, the lens structure further comprising a conical approximation of a toroidal lens having a minor radius $r_t$.

5. A brightness enhancing structure as defined in claim 3, further comprising a transparent central portion having a thickness d optically coupled between the hemi-bead monolayer array and the microstructured surface.

6. A brightness enhancing structure as defined in claim 4, further comprising a transparent central portion having a thickness d optically coupled between the hemi-bead monolayer array and the microstructured surface.

7. A brightness enhancing structure as defined in claim 5, wherein:

$$r_t = r_o = \frac{r_1 + r_2}{2}$$

where $r_1$ is the radius of the one of the hemi-beads and $r_2$ is the radius of a non light-reflecting region of the one of the hemi-beads which would exist in the absence of the toroidal lens.

8. A brightness enhancing structure as defined in claim 6, wherein:

$$r_t = r_o = \frac{r_1 + r_2}{2}$$

where $r_1$ is the radius of the one of the hemi-beads and $r_2$ is the radius of a non light-reflecting region of the one of the hemi-beads which would exist in the absence of the conical approximation of the toroidal lens.

9. A brightness enhancing structure as defined in claim 7, wherein d has a value $d_0$:

$$d_o = \left(\frac{\eta_o}{\eta_1 - \eta_o}\right) r_0$$

where $\eta_0$ is the refractive index of a medium on the outward side of the sheet and $\eta_1$ is the refractive index of the one of the hemi-beads.

10. A brightness enhancing structure as defined in claim 8, wherein d has a value $d_0$:

$$d_o = \left(\frac{\eta_o}{\eta_1 - \eta_o}\right) r_0$$

where $\eta_0$ is the refractive index of a medium on the outward side of the sheet and $\eta_1$ is the refractive index of the one of the hemi-beads.

11. A brightness enhancing structure as defined in claim 5, wherein the toroidal lens is sized and positioned, relative to the one of the hemi-beads, to align a focal ring of the toroidal lens substantially coplanar with and substantially centered with respect to an outward surface of the one of the hemi-beads.

12. A brightness enhancing structure as defined in claim 11, wherein the toroidal lens is further sized and positioned, relative to the one of the hemi-beads, so that the focal ring of the toroidal lens is substantially coextensive with a non light-reflecting region of the one of the hemi-beads which would exist in the absence of the toroidal lens.

13. A brightness enhancing structure as defined in claim 6, wherein the conical approximation of the toroidal lens is sized and positioned, relative to the one of the hemi-beads, to align a focal ring of the conical approximation of the toroidal lens substantially coplanar with and substantially centered with respect to an outward surface of the one of the hemi-beads.

14. A brightness enhancing structure as defined in claim 13, wherein the conical approximation of the toroidal lens is further sized and positioned, relative to the one of the hemi-beads, so that the focal ring of the conical approximation of the toroidal lens is substantially coextensive with a non light-reflecting region of the one of the hemi-beads which would exist in the absence of the conical approximation of the toroidal lens.

15. A brightness enhancing structure as defined in claim 9, wherein d has a value $d=0.5d_0$.

16. A brightness enhancing structure as defined in claim 10, wherein d has a value $d=0.5d_0$.

17. A brightness enhancing structure as defined in claim 7, wherein $r_t$ has a value $r_t=0.8r_0$.

18. A brightness enhancing structure as defined in claim 8, wherein $r_t$ has a value $r_t=0.8r_0$.

19. A brightness enhancing structure as defined in claim 9, wherein d has a value $d=0.5d_0$ and $r_t$ has a value $r_t=0.8r_0$.

20. A brightness enhancing structure as defined in claim 10, wherein d has a value $d=0.5d_0$ and $r_t$ has a value $r_t=0.8r_0$.

21. A reflective display having a brightness enhancing structure as defined in claim 1.

22. A reflective display having a brightness enhancing structure as defined in claim 2.

23. A reflective display having a brightness enhancing structure as defined in claim 3.

24. A reflective display having a brightness enhancing structure as defined in claim 4.

25. A reflective display having a brightness enhancing structure as defined in claim 5.

26. A reflective display having a brightness enhancing structure as defined in claim 6.

27. A reflective display having a brightness enhancing structure as defined in claim 7.

28. A reflective display having a brightness enhancing structure as defined in claim 8.

29. A reflective display having a brightness enhancing structure as defined in claim 9.

30. A reflective display having a brightness enhancing structure as defined in claim 10.

31. A reflective display having a brightness enhancing structure as defined in claim 11.

32. A reflective display having a brightness enhancing structure as defined in claim 12.

33. A reflective display having a brightness enhancing structure as defined in claim 13.

34. A reflective display having a brightness enhancing structure as defined in claim 14.

35. A method of enhancing the brightness of a reflective display, the method comprising:
  (a) providing a transparent sheet having an inward surface and an outward surface;
  (b) substantially covering the inward surface of the sheet with a plurality of inwardly protruding, approximately hemispherical, transparent hemi-beads; and
  (c) redirecting incident light through the sheet toward each one of the hemi-beads, such that the redirected light is totally internally reflected by the hemi-beads.

36. A method as defined in claim 35, wherein the redirecting incident light further comprises providing a plurality of substantially toroidal lenses on the outward side of the sheet.

37. A method as defined in claim 36, further comprising sizing and positioning each toroidal lens, relative to an adjacent one of the hemi-beads, to align a focal ring of the toroidal lens substantially coplanar with and substantially centered with respect to an outward surface of the adjacent one of the hemi-beads.

38. A method as defined in claim 37, further comprising sizing and positioning each toroidal lens, relative to an adjacent one of the hemi-beads, to align the focal ring substantially coextensively with a non light-reflecting region of the one of the hemi-beads which would exist in the absence of the toroidal lens.

* * * * *